US012610951B2

(12) United States Patent (10) Patent No.: US 12,610,951 B2
Sharma et al. (45) Date of Patent: Apr. 28, 2026

(54) PROCESS FOR PREPARING 1-AMINO-1-CYCLOPROPANECARBOXYLIC ACID GRANULES

(71) Applicant: Valent BioSciences LLC, Libertyville, IL (US)

(72) Inventors: Parvesh Sharma, Buffalo Grove, IL (US); Yueqian Zhen, Gurnee, IL (US); John Lopez, Gurnee, IL (US); Mitsuhiro Sasakawa, Tokyo (JP)

(73) Assignee: VALENT BIOSCIENCES LLC, Libertyville, IL (US)

( * ) Notice: Subject to any disclaimer, the term of this patent is extended or adjusted under 35 U.S.C. 154(b) by 147 days.

(21) Appl. No.: 17/589,970

(22) Filed: Feb. 1, 2022

(65) Prior Publication Data

US 2022/0240513 A1 Aug. 4, 2022

Related U.S. Application Data

(60) Provisional application No. 63/144,341, filed on Feb. 1, 2021.

(51) Int. Cl.
*A01N 53/00* (2006.01)
*A01N 25/14* (2006.01)
*A01P 21/00* (2006.01)

(52) U.S. Cl.
CPC .............. *A01N 53/00* (2013.01); *A01N 25/14* (2013.01); *A01P 21/00* (2021.08)

(58) Field of Classification Search
CPC ...................................................... A01N 53/00
See application file for complete search history.

(56) References Cited

U.S. PATENT DOCUMENTS

| | | | | |
|---|---|---|---|---|
| 4,367,344 | A * | 1/1983 | Gallenkamp .......... | A01N 53/00 560/48 |
| 6,984,609 | B2 * | 1/2006 | Devisetty ................. | C08K 5/04 524/17 |
| 10,517,299 | B2 | 12/2019 | Sharma et al. | |
| 2013/0109569 | A1 * | 5/2013 | Dave ...................... | A01N 25/28 977/788 |
| 2017/0325457 | A1 * | 11/2017 | Heidebrecht, Jr. .... | C07H 15/26 |

FOREIGN PATENT DOCUMENTS

| | | | | | |
|---|---|---|---|---|---|
| CN | | 103314957 A | * | 9/2013 | |
| CN | | 103947672 A | | 7/2014 | |
| CN | | 103314957 B | | 8/2015 | |
| WO | WO-2010064513 A1 | * | 6/2010 | ............. | A01N 25/14 |

OTHER PUBLICATIONS

Translated WO 2010064513 A1 (Year: 2010).*
International Search Report and Written Opinion mailed Apr. 14, 2022 in the corresponding PCT Application No. PCT/US2022/014660.

* cited by examiner

*Primary Examiner* — Andrew S Rosenthal
*Assistant Examiner* — Danielle Kim
(74) *Attorney, Agent, or Firm* — Wood, Phillips, Katz, Clark & Mortimer

(57) ABSTRACT

The present invention is directed to processes for preparing stable 1-amino-1-cyclopropanecarboxylic acid ("ACC") water-soluble granules comprising the steps of mixing a composition comprising ACC and water at a concentration ratio at about 2.0:1 or less to create a wet mass, extruding the wet mass to create an extrudate and drying the extrudate to create the water-soluble ACC granules, wherein the concentration of ACC and water is weight by total weight of the wet mass. The present invention is further directed to ACC granules produced by processes of the present invention.

17 Claims, 1 Drawing Sheet
(1 of 1 Drawing Sheet(s) Filed in Color)

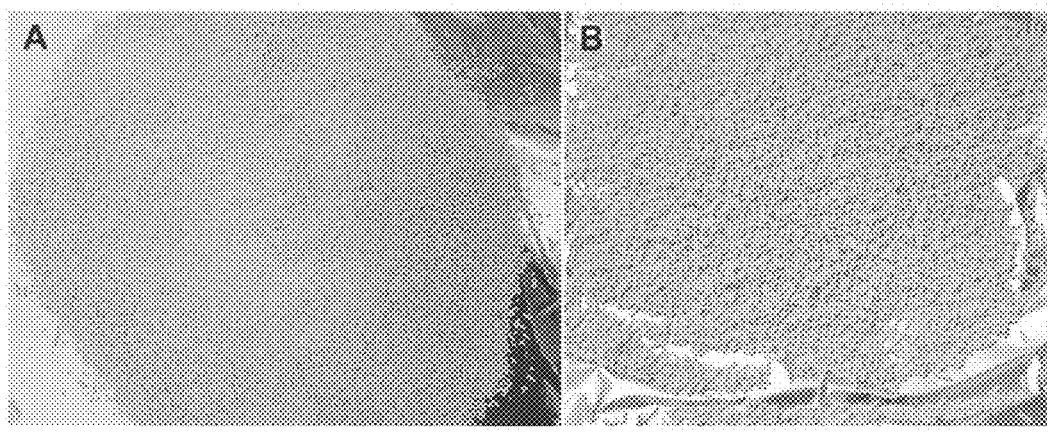

PROCESS FOR PREPARING 1-AMINO-1-CYCLOPROPANECARBOXYLIC ACID GRANULES

FIELD OF THE INVENTION

The present invention relates to processes for preparing stable 1-amino-1-cyclopropanecarboxylic acid ("ACC") water-soluble granules comprising the steps of mixing a composition comprising ACC and water at a concentration ratio at about 2.0:1 or less to create a wet mass, extruding the wet mass to create an extrudate and drying the extrudate to create the water-soluble ACC granules, wherein the concentration of ACC and water is weight by total weight of the wet mass. The present invention further relates to ACC granules produced by processes of the present invention.

BACKGROUND OF THE INVENTION 1-amino-1-cyclopropanecarboxylic acid ("ACC") is synthesized by ACC synthase in plants and acts as a precursor for the biosynthesis of ethylene. Ethylene has been shown to be involved in several plant responses including stress, fruit set, leaf abscission and anthesis. Because of its role as an ethylene precursor ACC is known to induce ethylene responsive events.

ACC has been formulated in ready-to-use sprays and concentrated liquids. See, U.S. Patent Application Publication No. 2018-0279621 A1 (published Oct. 4, 2018) and U.S. Pat. No. 10,517,299 B2 (published Dec. 31, 2019). While liquid formulations have many storage and application benefits, certain applications require solid formulations. Further, solid formulations have their own handling, transport, and storage benefits.

Water-soluble granules are one type of solid formulations that are preferred by farmers due to their storage stability, low dustiness, and ease of dissolving prior to application. Water-soluble granules are the preferred formulation for particular application types, especially those that need higher concentrations. However, ACC has not been formulated as a water-soluble granule. Thus, there is a need in the art for a stable ACC water-soluble granule formulation and processes for preparation of a stable ACC water-soluble granule.

SUMMARY OF THE INVENTION

The present invention relates to processes for preparing stable 1-amino-1-cyclopropanecarboxylic acid ("ACC") water-soluble granules comprising the steps of mixing a composition comprising ACC and water at a concentration ratio at about 2.0:1 or less to create a wet mass, extruding the wet mass to create an extrudate and drying the extrudate to create the water-soluble ACC granules, wherein the concentration of ACC and water is weight by total weight of the wet mass. The present invention further relates to ACC granules produced by processes of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1. Extrudate formation upon extrusion of ACC wet mass, panel A 40% ACC and 21% water and panel B 40% ACC and 27% water.

DETAILED DESCRIPTION OF THE INVENTION

A good quality water-soluble granule must be easily soluble in water, resilient and resistant to attrition. Brittle granules demonstrating high attrition break down into powder or fine dust during shipping and handling resulting in an undesirable end product. Brittle granules are usually the result of low concentrations of water being used during the processing of the water-soluble granule. However, efforts to overcome attrition by increasing water concentration during the processing of water-soluble granules can lead to undesirably sticky granules which lead to handling issues and loss during manufacturing. Applicant unexpectedly discovered that the preparation of useful 1-amino-1-cyclopropanecarboxylic acid ("ACC") water-soluble granules requires a relatively high concentration of water. This high concentration of water does not lead to sticky extrudate and granules as would be expected. In fact, this high concentration of water leads to a reduction in the resistance experienced by the extruder when low concentrations of water are used. Specifically, the Applicant has unexpectedly discovered that a concentration ratio of ACC in the granule to water in the wet mass of about 2.8:1 or less results in good quality extrudate and granules that are neither brittle nor sticky. This concentration ratio is unexpected as other plant growth regulators are capable of being formulated as water-soluble granules with a concentration ratio of plant growth regulator in the granule to water in the wet mass of as much as 5:1. Thus, ACC water-soluble granules of the present invention require surprisingly high concentrations of water in the wet mass as compared to the concentration of ACC in the water-soluble granule.

Further, the Applicant has unexpectedly discovered that a concentration ratio of ACC in the wet mass to water in the wet mass of about 2.0:1 or less results in good quality extrudate and granules that are neither brittle nor sticky. This concentration ratio is unexpected as other plant growth regulators are capable of being formulated as water-soluble granules with a concentration ratio of plant growth regulator in the wet mass to water in the wet mass of as much as 5:1. Thus, ACC water-soluble granules of the present invention require surprisingly high concentrations of water in the wet mass as compared to the concentration of ACC in the wet mass.

In one embodiment, the present invention is directed to processes for preparing stable 1-amino-1-cyclopropanecarboxylic acid ("ACC") water-soluble granules comprising the steps of mixing a composition comprising ACC and water at a concentration ratio at about 2.0:1 or less to create a wet mass, extruding the wet mass to create an extrudate and drying the extrudate to create the water-soluble ACC granules, wherein the concentration of ACC and water is weight by total weight of the wet mass.

In a preferred embodiment, the extruding step comprises extruding the wet mass through an extruder having a pore size from about 0.4 to about 2.0 millimeters, more preferably from about 0.6 to about 2.0 millimeters, even more preferably from about 0.6 to about 1.2 millimeters and most preferably about 1.0 millimeters.

In a preferred embodiment, drying of the extrudate occurs at a temperature from about 25 to about 400 degrees Celsius. The preferred drying temperature depends on several factors including drying method, time and relative humidity. In another embodiment drying of the extrudate occurs at a temperature from about 30 to about 140 degrees Celsius, from about 30 to about 50 degrees Celsius, from about 35 to about 45 degrees Celsius and at about 40 degrees Celsius. In another embodiment, drying of the extrudate occurs at a temperature range from about 50 to about 150 degrees Celsius and more preferably from about 50 to about 100 degrees.

As used herein the term "drying" refers to any method of removing liquid from the granule including heat in vibratory fluid bed dryer (e.g. using hot air), microwave, vacuum, infrared, or any combination thereof.

Microwave drying is the drying of granules by sending microwaves through the granules causing an increase in the temperature of liquid in the granule. Vacuum drying is the removal of liquid from the granule by pulling the liquid out of the granule via a pressure difference between the granule and the area surrounding the granule.

In a preferred embodiment, drying of the extrudate occurs for from about 1 minute to about 10 days. Drying time depends on several factors including the drying method, temperature, rate of drying, and relative humidity. In another embodiment, drying of the extrudate occurs from about 1 hour to about 20 hours or from about 8 hours to about 10 hours.

In another preferred embodiment, the ACC to water concentration ratio in processes of the present invention are at about 2.0 or less, preferably at about 1.9 or less, preferably from about 1.87:1 to about 1:3.63, more preferably about 1.7 or less, even more preferably from about 1.66:1 to about 1:3.33, yet even more preferably from about 1.46:1 to about 1:1 and most preferably at about 1.12:1 or about 1.4:1, wherein the concentration ratio compares the weight of ACC in the total weight of the wet mass to the weight of water in the total weight of the wet mass.

In another preferred embodiment, the ACC to water concentration ratio in processes of the present invention are at about 2.8 or less, preferably at about 2.0 or less, even more preferably at about 1.9 or less, and even more preferably from about 2.77:1 to about 1:3.2, more preferably about 2.6 or less, even more preferably from about 2.56:1 to about 1:3.33, yet even more preferably from about 1.86:1 to about 1:1 and most preferably at about 2.0:1, 1.9:1 or 1.86:1, wherein the concentration ratio compares the weight of ACC in the water-soluble granule to the weight of water in the total weight of the wet mass.

In another preferred embodiment, the concentration of ACC in the water-soluble granule in processes of the present invention are from about 5% to about 90% w/w, preferably from about 10% to about 80% w/w, even preferably from about 10% to about 40% w/w, even more preferably from about 20% to about 60% w/w and most preferably at about 40% w/w.

In another preferred embodiment, the water concentration in the wet mass in processes of the present invention are from about 8% to about 55% w/w, preferably from about 15% to about 30% w/w, even more preferably from about 20% to about 30% w/w and even more preferably from about 20% to about 24% w/w or from about 26.5% to about 28.5% w/w.

In another preferred embodiment, the concentration of water in the water-soluble granule is from about 0.1% to about 10% w/w, more preferably from about 0.5% to about 5% w/w, even more preferably from about 0.5% to about 4% w/w and most preferably at about 0.5, 1, 1.5, 2, 2.5, 3 or 3.5% w/w. Water concentrations in the water-soluble granule are based on the amount of water as measured by the loss on drying method.

In another embodiment, the present invention is directed to an ACC water-soluble granule prepared by the processes of the present invention.

Throughout the application, the singular forms "a," "an," and "the" include plural reference unless the context clearly dictates otherwise.

As used herein, all numerical values relating to amounts, weight percentages and the like that are defined as "about" or "approximately" each particular value denotes plus or minus 10% of that particular value. For example, the phrase "about 10% w/w" is to be understood as encompassing values from 9% to 11% w/w. Therefore, amounts within 10% of the claimed values are encompassed by the scope of the invention.

The invention is demonstrated by the following representative examples. These examples are offered by way of illustration only and not by way of limitation.

EXAMPLES

Example 1—Process for Preparing an ACC Water-Soluble Granule

Method

Binder solution prepared in water is sprayed onto an ACC active ingredient and inert filler dry powder mixture to form a wet mass in an open-air system under laboratory conditions. The wet mass is fed into an extruder. The extruder forces the wet mass through a die having 1.0 mm pores forming an extrudate. The extrudate is then dried 24 hours at 40 degrees Celsius resulting in an ACC water-soluble granule. Granule size may be selected by passing the dried extrudate through mesh screens having various pore sizes.

Results

As seen in FIG. 1 panel A, the addition of binder solution containing 21% water (weight by total weight of the wet mass) to an amount of ACC and inert filler dry powder mixture sufficient to provide about 40% ACC (weight by total weight of the ACC water-soluble granule) resulted in a low moisture extrudate that formed undesirably brittle granules. Surprisingly, the addition of from 21% to 24% water (weight by total weight of the wet mass) to an amount of ACC dry powder sufficient to provide about 40% ACC (weight by total weight of the ACC water-soluble granule) resulted in well-formed, resilient extrudates and granules after drying. See FIG. 1 panel B. The drying of these well-formed extrudate yielded well-formed granules with a moisture content of about 3% w/w as measured by the loss on drying method. Loss on drying method can be performed on common instruments such as the CEM Smart 5, OHAUS or Mettler Toledo moisture analyzers.

Further experiments in a system closed to outside air ("closed-air system") demonstrated that the addition of binder solution containing 20% water (weight by total weight of the wet mass) to an amount of ACC and inert filler dry powder mixture sufficient to provide about 40% ACC (weight by total weight of the ACC water-soluble granule) resulted in well-formed, resilient extrudates and granules after drying. Not to be held to a particular theory, the Applicant believes that the open-air system led to additional water loss during the preparation of the granule as compared to the closed-air system such that a smaller amount of water can be used in a closed-air system as compared to an open-air system to achieve similar well-formed granules.

Example 2—Stability of ACC Water-Soluble Granules of the Present Invention

Method

A 40% ACC water-soluble granule was prepared by the process of Example 1, above, using about 30% water in the wet mass. These granules were tested for ACC concentration, attrition resistance and solubility in water before and after being subject to temperatures of either 5 or 54 degrees Celsius for 2 weeks. Attrition is defined as the wearing away of the surface of a granule by friction or impact. Attrition was tested under similar or more stringent standards than those provided by the International Pesticides Analytical Council (CIPAC) under code MT 178.2. Results can be seen in Table 1, below.

TABLE 1

| | T = 0 | 5° C. for 2 weeks | 54° C. for 2 weeks |
|---|---|---|---|
| Assay (% ACC w/w) | 39.5 | 39.4 | 39.4 |
| Attrition | <1% | <1% | <1% |
| No. of inversions to dissolve in water | <15 | <15 | <15 |

Results

As seen in Table 1, ACC water-soluble granules prepared by the processes of the present invention are stable under accelerated storage conditions.

Example 3—Stability of ACC Water-Soluble Granules of the Present Invention

Method

A 40% ACC water-soluble granule was prepared by the process of Example 1, above, using 30% water in the wet mass. These granules were tested for ACC concentration before and after being subject to temperatures of either 5, 25, 30 or 40 degrees Celsius for up to 2 years. ACC concentration was determined at time 0 and 3, 12, 18 and 24 months. Results can be seen in Table 2, below.

TABLE 2

| Temperature (° C.) | Time 0 | 3 Months | 12 Months | 18 Months | 24 Months |
|---|---|---|---|---|---|
| 5 | 39.4 | 39.3 | 39.8 | — | — |
| 25 | 39.4 | 39.4 | 39.8 | 39.8 | 39.1 |
| 30 | 39.4 | 39.2 | 39.8 | 39.5 | 39.5 |
| 40 | 39.4 | 39.6 | 39.8 | 39.6 | 39.7 |

Results

As seen in Table 2, ACC water-soluble granules prepared by the processes of the present invention are stable under accelerated and extended storage conditions.

Example 4—Stability of ACC Water-Soluble Granules of the Present Invention at Various Ratios

Method

An ACC water-soluble granule was prepared by the process of Example 1, above using the concentrations as found in Table 3, below. Results can be seen in Table 3, below.

TABLE 3

| Examples | 1 | 2 | 3 | 4 | 5 |
|---|---|---|---|---|---|
| % ACC in granule | 4 | 20 | 30 | 40 | 76 |
| % ACC in wet mass | 3.5 | 16.3 | 23.4 | 29.1 | 46.0 |
| % Water in wet mass | 12.7 | 18.3 | 22.1 | 27.2 | 39.5 |
| Ratio of ACC in wet mass/Water in wet mass | 1:3.63 | 1:1.11 | 1.1:1 | 1.1:1 | 1.2:1 |
| Ratio of ACC in granule/Water in wet mass | 1:3.2 | 1.1:1 | 1.4:1 | 1.5:1 | 1.9:1 |

Results

As seen in Table 3, the addition of water to ACC dry powder at ratios of ACC concentration in the wet mass to water concentration in the wet mass from 1.2:1 to 1:3.63 and at ratios of ACC concentration in the dry granule to water concentration in the wet mass from 1.9:1 to 1:3.2 resulted in well-formed, resilient extrudates and granules after drying.

What is claimed is:

1. A process for preparing a stable 1-amino-1-cyclopropanecarboxylic acid ("ACC") water-soluble granule comprising the steps of:
   mixing a composition comprising ACC and water at a concentration ratio from about 1.5:1 to about 1:3.2 to create a wet mass;
   extruding the wet mass to create an extrudate; and
   drying the extrudate to create the water-soluble ACC granules,
wherein the concentration of ACC is weight by total weight of the ACC granules and the concentration of water is weight by total weight of the wet mass.

2. The process of claim 1, wherein the concentration ratio of ACC to water is about 1.1:1.

3. The process of claim 1, wherein the concentration of ACC is from about 5% to about 90%.

4. The process of claim 1, wherein the concentration of ACC is from about 20% to about 60%.

5. The process of claim 1, wherein the concentration of ACC is about 40%.

6. The process of claim 1, wherein the concentration of water is from about 8% to about 55%.

7. The process of claim 1, wherein the concentration of water is from about 20% to about 40%.

8. The process of claim 1, wherein the concentration of water is from about 20% to about 28.5%.

9. The process of claim 1, wherein the drying step occurs at a temperature from about 25 to about 400 degrees Celsius.

10. The process of claim 1, wherein the drying step occurs at a temperature from about 30 to about 50 degrees Celsius.

11. The process of claim 1, wherein the drying step occurs at a temperature from about 50 to about 150 degrees Celsius.

12. The process of claim 1, wherein the drying step occurs for from about 1 minute to about 10 days.

13. The process of claim 1, wherein the drying step occurs for from about 8 hours to about 10 hours.

14. A process for preparing a stable 1-amino-1-cyclopropanecarboxylic acid ("ACC") water-soluble granule comprising the steps of:
   mixing about 40% ACC and from about 26% to about 28.5% water to create a wet mass;
   extruding the wet mass to create an extrudate; and
   drying the extrudate at about 40 degrees Celsius for from about 8 to about 10 hours to create the water-soluble ACC granules, wherein ACC and water are at a concentration ratio from about 1.5:1 to about 1:3.2 and wherein the concentration of ACC is weight by total weight of the water-soluble ACC granule and the concentration of water is weight by total weight of the wet mass.

15. The process of claim 14, wherein the extruding step comprises extruding the wet mass through an extruder having a pore size of about 1 millimeters.

16. The process of claim 14, wherein the concentration of water in the water-soluble granule is from about 0.1% to about 10% weight by total weight of the water-soluble granule.

17. A stable ACC water-soluble granule prepared by the process of claim 1.

\* \* \* \* \*